(12) United States Patent
Desforges et al.

(10) Patent No.: US 10,633,984 B2
(45) Date of Patent: Apr. 28, 2020

(54) TURBINE FOR A TURBINE ENGINE

(71) Applicant: Safran Aircraft Engines, Paris (FR)

(72) Inventors: Jean-Baptiste Vincent Desforges, Moissy-Cramayel (FR); Gaël Frédéric Claude Cyrille Evain, Moissy-Cramayel (FR); Olivier Arnaud Fabien Lambert, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 140 days.

(21) Appl. No.: 15/811,986

(22) Filed: Nov. 14, 2017

(65) Prior Publication Data

US 2018/0135433 A1    May 17, 2018

(30) Foreign Application Priority Data

Nov. 15, 2016 (FR) ...................................... 16 61044

(51) Int. Cl.
| | |
|---|---|
| *F01D 5/20* | (2006.01) |
| *F02K 3/04* | (2006.01) |
| *F01D 5/14* | (2006.01) |
| *F01D 25/24* | (2006.01) |
| *F01D 5/22* | (2006.01) |
| *F01D 11/12* | (2006.01) |

(52) U.S. Cl.
CPC ............... *F01D 5/20* (2013.01); *F01D 5/147* (2013.01); *F01D 5/225* (2013.01); *F01D 11/122* (2013.01); *F01D 25/246* (2013.01); *F02K 3/04* (2013.01); *F05D 2220/323* (2013.01)

(58) Field of Classification Search
None
See application file for complete search history.

(56) References Cited

U.S. PATENT DOCUMENTS

| 4,507,052 | A | * | 3/1985 | Thompson | ............ F01D 11/006 |
| | | | | | 415/173.7 |
| 4,650,395 | A | * | 3/1987 | Weidner | .................. F01D 11/08 |
| | | | | | 415/115 |
| 4,925,365 | A | * | 5/1990 | Crozet | ...................... F01D 9/04 |
| | | | | | 277/415 |

(Continued)

FOREIGN PATENT DOCUMENTS

| EP | 2 613 014 A2 | 7/2013 |
| EP | 2 636 853 A1 | 9/2013 |

(Continued)

*Primary Examiner* — Michael Lebentritt
(74) *Attorney, Agent, or Firm* — Blank Rome LLP

(57) ABSTRACT

A turbine for a turbine engine, the turbine comprising a rotor including blades the radially external periphery of which includes at least one first wiper radially extending outwards, sealing means radially extending about the blades and including a ring made of abradable material, with the radially external ends of the wipers cooperating with said ring made of abradable material so as to form a labyrinth-type seal, wherein said ring includes at least one first portion axially extending upstream of the first wiper and a second portion, different from the first portion, axially extending downstream of the first wiper, with the first portion and/or the second portion including a groove, wherein the first wiper has been inserted, with said groove being defined by the first portion and by the second portion.

11 Claims, 2 Drawing Sheets

(56) References Cited

U.S. PATENT DOCUMENTS

| | | | | |
|---|---|---|---|---|
| 6,062,813 A * | 5/2000 | Halliwell | F01D 9/04 | 415/173.1 |
| 2002/0145258 A1* | 10/2002 | Nava | F01D 11/122 | 277/415 |
| 2005/0002780 A1* | 1/2005 | Tanaka | F01D 5/225 | 415/173.1 |
| 2005/0111967 A1* | 5/2005 | Couture | F01D 5/225 | 415/173.4 |
| 2006/0133928 A1* | 6/2006 | Bracken | F01D 5/225 | 415/173.4 |
| 2007/0248452 A1* | 10/2007 | Brisson | F01D 11/06 | 415/10 |
| 2007/0253810 A1* | 11/2007 | Mons | B22F 3/1055 | 415/174.5 |
| 2011/0280735 A1* | 11/2011 | Dakowski | F01D 5/082 | 416/97 R |
| 2012/0085156 A1* | 4/2012 | Gaisnon | G01N 27/9033 | 73/112.01 |
| 2013/0223990 A1* | 8/2013 | Cloarec | F01D 5/26 | 415/119 |
| 2014/0286766 A1* | 9/2014 | Ekanayake | F01D 11/24 | 415/201 |
| 2014/0308116 A1* | 10/2014 | Witz | F01D 9/04 | 415/174.4 |
| 2015/0118035 A1* | 4/2015 | Gendraud | F01D 9/041 | 415/191 |
| 2015/0275674 A1* | 10/2015 | Alvarez Garcia | F01D 11/001 | 416/95 |
| 2016/0040547 A1* | 2/2016 | Clouse | F01D 25/246 | 60/805 |
| 2017/0114659 A1* | 4/2017 | Imbourg | F04D 29/102 | |
| 2017/0198591 A1* | 7/2017 | Roussille | F01D 5/282 | |
| 2018/0252114 A1* | 9/2018 | Massot | F01D 11/122 | |
| 2018/0306048 A1* | 10/2018 | Telman | F02C 7/28 | |
| 2018/0355745 A1* | 12/2018 | Mathew | F01D 11/125 | |

FOREIGN PATENT DOCUMENTS

| | | |
|---|---|---|
| EP | 2 789 804 A1 | 10/2014 |
| FR | 2 879 649 A1 | 6/2006 |
| WO | WO 2014/168804 A1 | 10/2014 |

* cited by examiner

TURBINE FOR A TURBINE ENGINE

CROSS-REFERENCE TO RELATED APPLICATIONS

This application claims the benefit of French Patent Application No. 1661044, filed Nov. 15, 2016, the contents of which is incorporated herein by reference.

TECHNICAL FIELD

The present invention relates to a turbine for a turbine engine, more particularly for a turbojet engine or a turboprop engine of an aircraft, as well as a method for mounting such a turbine.

BACKGROUND

A turbine engine, specifically a twin-spool turbine engine, conventionally includes, in the downstream direction, a fan, a low pressure compressor, a high pressure compressor, a combustion chamber, a high pressure turbine and a low pressure turbine.

Conventionally, in the present application, "upstream" and "downstream" are defined relative to the direction of the air flow in the turbine engine. Conventionally, in the present application, "internal" and "external," "lower" and "higher," and "internal" and "external" are similarly defined radially relative to the axis of the turbine engine.

The low pressure turbine of a turbine engine comprises a turbine shaft whereon several successive stages, each including an impeller and a guide vane are mounted. Each impeller comprises a disk, on the external periphery of which substantially radial blades are mounted, with the disks of the various impellers being coaxially connected together and to the driving shaft of the turbine rotor, using appropriate means. Each guide vane comprises an internal annular platform and an external annular platform between which substantially radial blades extend. The external platform of the guide vane comprises means for hooking and attaching on an external casing of the turbine. All the guide vanes form the stationary part of the engine called the stator.

The blades of each rotor wheel conventionally include wipers at the radially external periphery thereof, and cooperate with a ring made of an abradable material so as to form sealing means of the labyrinth seal type.

Such a structure is known for instance from document FR 2 879 649.

In order to ensure high performances of the turbine engine, the clearances at the seals have to be checked and the leakage rate at the interface between the blade wipers and the ring made of abradable material have to be limited.

The efficiency of such labyrinth seals has to be improved still.

SUMMARY

The invention more particularly aims at providing a simple, efficient and cost-effective solution to this problem.

For this purpose, it provides for a turbine for a turbine engine, specifically for a turbojet engine or a turboprop engine for an aircraft, comprising a rotor including blades, the radially external periphery of which includes at least one first wiper radially extending outwards, sealing means radially extending about the blades and including a ring made of abradable material, with the radially external ends of the wipers cooperating with said ring made of abradable material so as to form a seal of the labyrinth type, characterised in that said ring includes at least one first portion axially extending upstream of the first wiper and a second portion, different from the first portion, axially extending downstream of the first wiper, with the first portion and/or the second portion including a groove, wherein the first wiper has been inserted, with said groove being defined both by the first portion and by the second portion.

A first wiper, which forms a seal of the labyrinth type with the groove walls is thus obtained, with said seal having a significant head loss, i.e. a substantially higher one than in the prior art solution. As a matter of fact, a first wiper having large radial dimensions, engaged into a groove having large radial dimensions too, can be obtained, with the mounting being possible thanks to the two-portion structure of the ring.

Only one of the portions may include a recess intended to form the groove, with the other portion simply closing such recess so as to define one sidewall of the groove.

The first portion includes a groove radially opening outwards and axially opening in the downstream direction, with the second portion including a groove radially opening outwards and axially opening in the upstream direction, opposite the groove of the first portion.

The radially external periphery of the blades includes at least one radially extending second wiper, with the first wiper radially extending outwards relative to the second wiper.

The second wiper is able to cooperate with the first portion and/or with the second portion of the ring. Head losses are further increased, and thus the efficiency of the labyrinth seal between the blades and the ring made of abradable material.

The first portion and/or the second portion may include means for attachment to a turbine annular casing, able to attach the matching portion of the ring through an axial engagement in the upstream direction on flanges of said casing In this case, each flange includes a portion radially extending from a cylindrical or tapered wall of the casing, and an axially extending portion, which cooperates with the first portion or the second portion of the ring Each portion of the ring includes a block made of abradable material, mounted on an annular support.

Each portion may include at least one attachment member with a U-shaped general section, able to cooperate with a flange of the casing so as to provide the attachment of the support to the casing.

The turbine may include an upstream guide vane including a radially external platform, resting against an upstream flange of the casing, with the support of the first portion of the ring including an upstream attachment member attaching the external platform of the upstream guide vane to the upstream flange of the casing, while providing the attachment of the support of the first portion of the ring on said upstream flange.

The support of the second portion of the ring may include an upstream attachment member attaching the support of the first portion of the ring on a median flange of the casing, while attaching the support of the second portion of the ring on said median flange.

The turbine may include a downstream guide vane including a radially external platform, axially engaged on a downstream flange of the casing, with said external platform of the downstream guide vane being able to attach the support of the second portion of the ring to the downstream flange.

The invention also relates to a method for assembling a turbine of the above-mentioned type, characterised in that it includes the following steps:

(a) mounting the first portion of the ring on a casing of the turbine, through an axial engagement in the upstream direction of said first portion relative to the casing, (b) mounting the impeller in the casing, (c) mounting the second portion of the ring on the casing of the turbine, through an axial engagement in the upstream direction of said second portion relative to the casing, with the first wiper being introduced into the groove of the first portion and/or the second portion during step (b) and/or during step (c).

Such a method is simply and quickly implemented and enables an easy assembling and disassembling of the turbine.

BRIEF DESCRIPTION OF THE DRAWINGS

The invention will be better understood and other details, characteristics, and advantages of the invention will appear on reading the following description given by way of non-limiting example and with reference to the accompanying drawings, in which.

DETAILED DESCRIPTION

Figure 1:
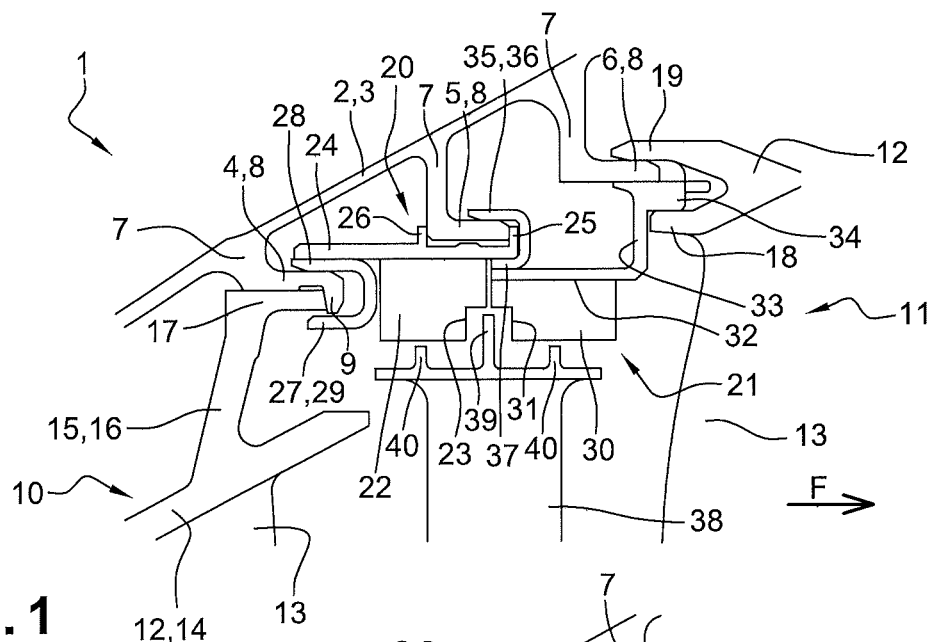
FIG. 1 is an axial view in perspective of a portion of a turbine according to one embodiment of the invention.
Figure 2:
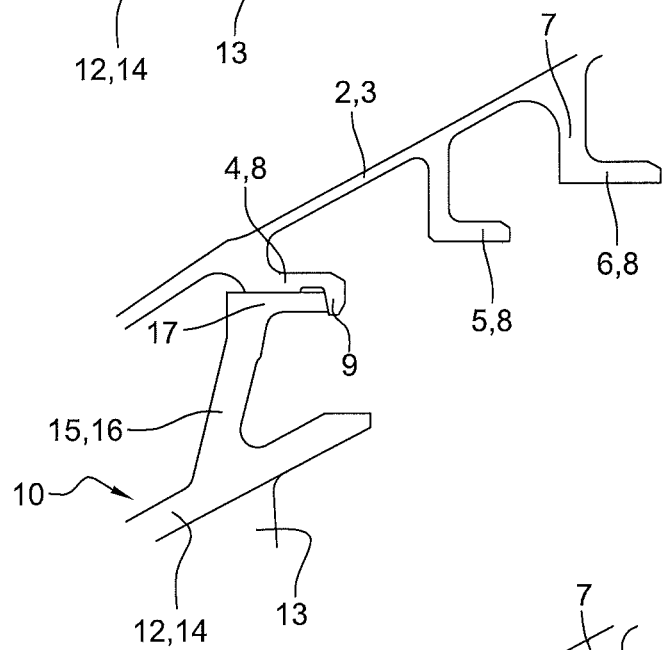
FIGS. 2 to 6 illustrate different steps for assembling the turbine of FIG. 1.
Figure 3:
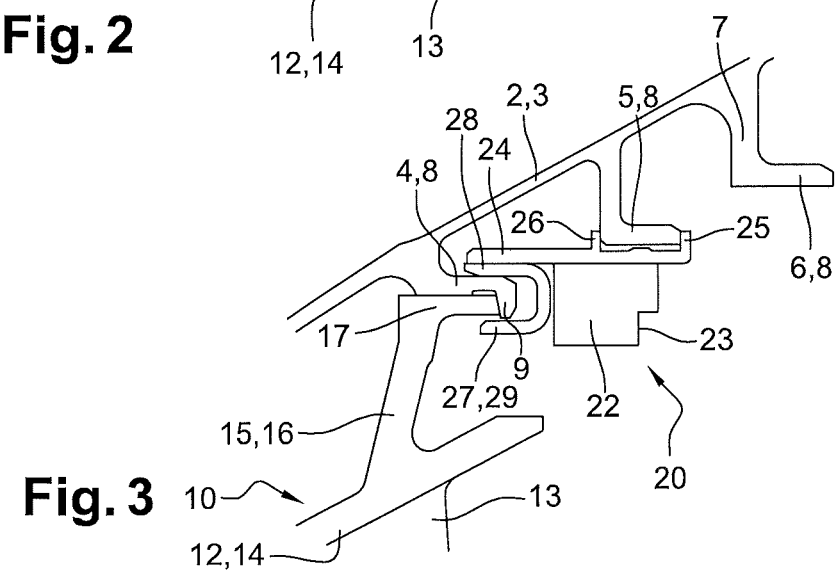
Figure 4:
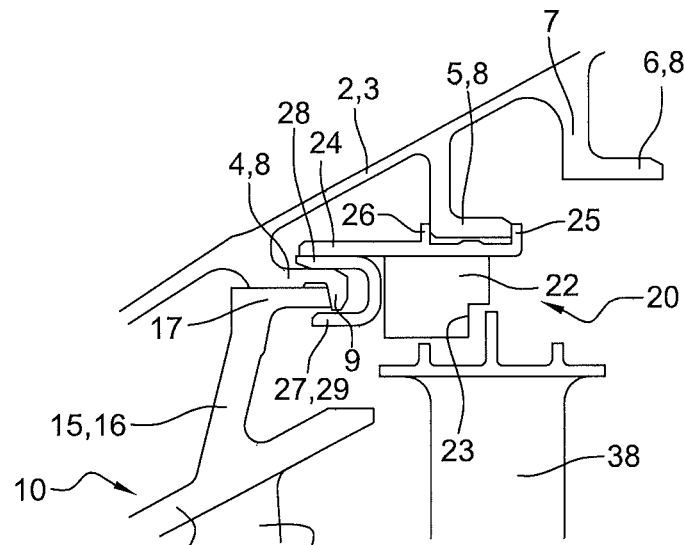
Figure 5:
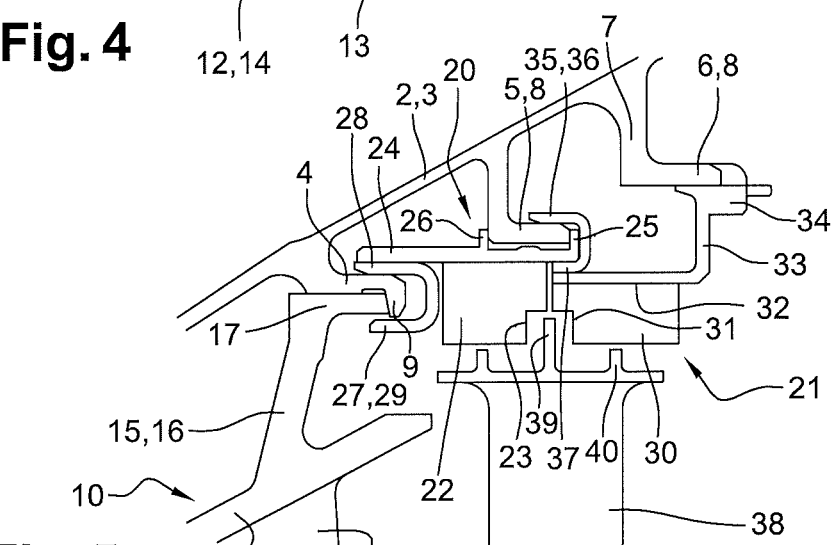
Figure 6:
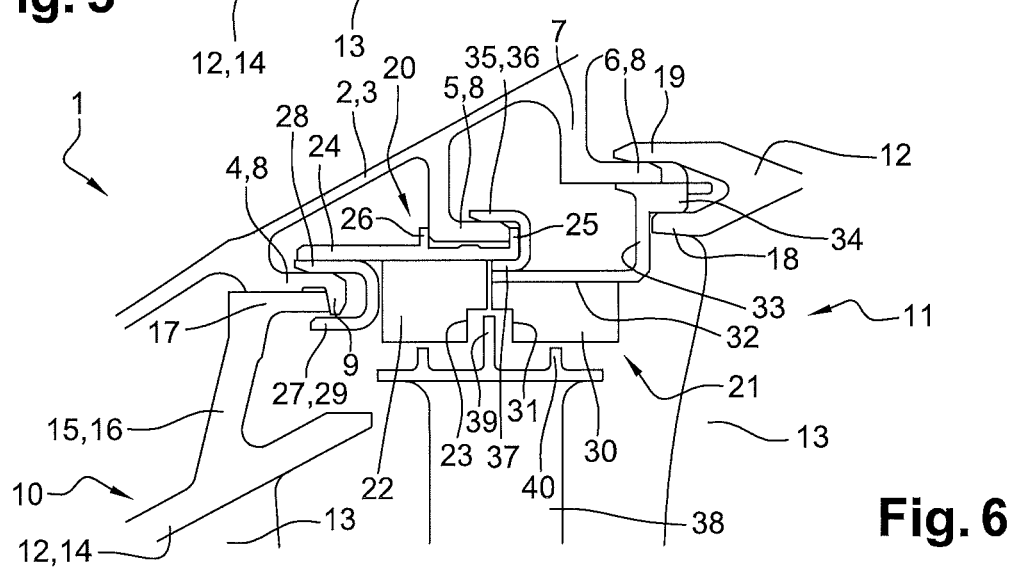

A low pressure turbine 1 of a turbine engine according to a first embodiment is shown in FIG. 1. The turbine 1 includes a fixed casing 2, having a tapered wall 3, the axis of which matches the axis of the turbine engine and from which flanges 4, 5, 6 radially extend inwards. The casing more particularly includes an upstream flange 4, a median flange 5 and a downstream flange 6. Upstream and downstream are defined relative to the direction F of the gas flow inside the turbine 1, i.e. from left to right in FIG. 1.

Each flange 4, 5, 6 includes a first annular portion 7 which extends radially inwards from the tapered wall 3, and a second cylindrical portion 8 which extends in the downstream direction.

The upstream flange 4 further includes an annular radial rim 9 which extends radially inwards from the downstream end of the second portion 8.

The stator of the turbine 1 specifically includes two stages of guide vanes, which will be respectively referred to as the upstream guide vane 10 and the downstream guide vane 11, with each guide vane 10, 11 including a radially internal platform (not visible), a radially external platform 12 and stationary blades 13 connecting said platforms.

The external platform 12 of the upstream guide vane 10 includes a globally tapered wall 14, the downstream end of which comprises a bearing area 15 including a first portion 16 which extends radially outwards and a second portion 17 which extends axially in the downstream direction.

The downstream end of the second portion 17 of the bearing area 15 axially bears onto the rim 9 of the upstream flange 4 of the casing 2, with the second portion 17 of the bearing area 15 further bearing onto the second portion 8 of the upstream flange 4.

The upstream end of the external platform 12 of the downstream guide vane 11 includes two rims 18, 19 which axially extend in the upstream direction, and are radially separated from each other. The radially internal rim 18 radially bears onto the radially external surface of the second portion 8 of the downstream flange 6. The function of the radially internal rim 18 will be described in greater details hereunder.

The turbine 1 further includes a ring comprising an abradable material, rigidly mounted on the casing 2 and formed in two parts 20, 21, i.e. an upstream part 20 and a downstream part 21.

The upstream part 20 specifically includes an upstream block 22 made of abradable material, having an annular shape. The upstream block 22 includes a groove 23 at the downstream end thereof, with said groove 23 opening radially outwards and axially in the downstream direction.

The external surface of the upstream block 22 is attached to an upstream support 24, having an annular shape. The upstream support 24 includes a rim 25 which extends radially outwards at the downstream end thereof and a rim 26 which extends radially outwards from a median zone of said upstream support 24.

The upstream support 24 is able to radially bear onto the second part 8 of the median flange 5, with the rims 25 et 26 of the upstream support 24 being able to axially bear onto the upstream and downstream ends of the second part 8 of the median flange 5.

An annular attachment member 27 with a U-shaped section, is attached at the upstream end of the upstream support 24 radially inside said upstream support 24. Said upstream attachment members 27 include a radially external branch 28, radially bearing onto the external surface of the second portion 8 of the upstream flange 4, and a radially internal branch 29 radially bearing onto the second portion 17 of the bearing area 15 and onto the rim of the upstream support 4.

The upstream guide vane 10 is thus attached to the upstream flange 4 through said upstream attachment members 27. Such member 27 also makes it possible to attach the upstream support 24 on the upstream flange 4.

The downstream portion 21 of the ring includes a downstream block 30 made of abradable material, having an annular shape. The downstream block 30 includes a groove 31 at the upstream end thereof, with said groove 31 opening radially outwards and axially in the upstream direction.

The external surface of the downstream block 30 is attached to a downstream support 32, having an annular shape. The downstream support 32 includes a rim 33 which extends radially outwards at the downstream end, prolonged by a cylindrical attachment zone 34 which extends axially in the downstream direction from the external periphery of the rim 33.

An annular attachment member, having a U-shaped section or members positioned so that hooks having a U-shaped section 35 are attached at the upstream end of the downstream support 32, radially outside said downstream support 32. Said downstream attachment members 35 include a radially external branch 36, radially bearing onto the external surface of the second portion 8 of the median flange 5, and a radially internal branch 37 radially bearing onto the downstream end of the upstream support 24.

Besides, the attachment zone 34 bears onto the internal surface of the second portion 8 of the downstream flange 6.

As mentioned above, the radially external rim 19 of the external platform 12 of the downstream guide vane 11 radially bears onto the radially external surface of the second portion 8 of the downstream flange 6, with the radially internal rim 18 of said external platform 12 bearing onto the attachment zone 34 of the downstream portion 21 of the ring, so as to attach said downstream portion 21 of the ring to the downstream flange 6 of the casing 2.

The turbine 1 further includes a rotor wheel including blades 38, with the radially external periphery of each blade 38 including a first, axially central, wiper 39 and two second wipers 40 axially shifted on either side of the first wiper 39. The first and second wipers 39, 40 extend radially outwards, with the first wiper 39 extending radially outwards relative to the second wipers 40. The first wiper 39 is engaged into the grooves 23, 31 of the upstream and downstream parts 20, 21 of the ring. The second wipers 40 extend opposite the radially internal surfaces of the upstream and downstream blocks 22, 30.

The cumulative axial dimension of the grooves 23, 31 enables a displacement or an uncertain axial positioning of the rotor wheel, and thus of the first wiper 39, relative to the casing 2, with such uncertainty possibly resulting from the manufacturing and mounting tolerances as well as from the mechanical and/or thermal constraints in operation.

Such a turbine 1 is mounted as described hereunder.

The upstream guide vane 10 is mounted inside the casing 2, the upstream portion 20 of the ring is then axially engaged in the upstream direction into the casing 2, on the upstream 4 and median 5 flanges of the casing 2. The upstream attachment member 27 is engaged in the upstream flange 4 and in the part 17 of the upstream guide vane 10 so as to provide the attachment of the upstream guide vane 10 on the upstream flange 4. The rotor wheel with the blades 38 is then axially engaged into the casing 2, in the upstream direction, with the first wiper 39 being, at least partially, positioned in the groove 23 of the upstream abradable block 22. The second portion 21 of the ring is then axially engaged into the casing 2, in the upstream direction, with the downstream attachment members 35 cooperating with the median flange 5 and with the downstream end of the upstream support 24, as mentioned above. The upstream support 24 is thus attached to the median flange 5 through said downstream attachment members 35.

The downstream guide vane 11 is then axially engaged into the casing 2, in the upstream direction, with the rims 18, 19 of the external platform 12 of said downstream guide vane 11 cooperating the downstream flange 6 and with the attachment zone 34 of the downstream support 32, as mentioned above. The downstream support 32 is thus attached to the downstream flange 6 of the casing 2, using the downstream guide vane 11.

The invention claimed is:

1. A turbine for a turbine engine, the turbine comprising a rotor including blades having a radially external periphery of which includes at least one first wiper radially extending outwards, sealing means radially extending about the blades and including a ring made of abradable material, with radially external end(s) of the at least one first wiper cooperating with said ring to form a labyrinth-type seal, wherein said ring includes at least one first portion axially extending upstream of the at least one first wiper and a second portion, different from the first portion, axially extending downstream of the at least one first wiper, with at least one of the first portion and the second portion including a groove into which the at least one first wiper is inserted, with said groove being defined by the first portion and by the second portion.

2. The turbine of claim 1, wherein the radially external periphery of the blades includes at least one radially extending second wiper, with the first wiper radially extending outwards relative to the at least one second wiper.

3. The turbine of claim 1, wherein the first portion includes a groove radially opening outwards and axially opening in a downstream direction, and the second portion includes a groove radially opening outwards and axially opening in an upstream direction, opposite the groove of the first portion.

4. The turbine of claim 1, wherein at least one of the first portion and the second portion include means for attachment to a turbine annular casing, for attaching a matching portion of the ring by an axial engagement in an upstream direction on flanges of said turbine annular casing.

5. The turbine of claim 4, wherein each flange includes a portion radially extending from a cylindrical or tapered wall of the turbine annular casing, and an axially extending portion, which cooperates with at least one of the first portion and the second portion of the ring.

6. The turbine of claim 1, wherein each portion of the ring includes a block made of abradable material, mounted on an annular support, with each annular support including at least one attachment member with a U-shaped general section that cooperates with a flange of the turbine annular casing to provide attachment of the annular support to the turbine annular casing.

7. The turbine of claim 6, further comprising an upstream guide vane including a radially external platform, resting against an upstream flange of the turbine annular casing, wherein the annular support of the first portion of the ring includes an upstream attachment member attaching the external platform of the upstream guide vane to the upstream flange of the turbine annular casing, while providing the attachment of the annular support of the first portion of the ring on said upstream flange.

8. The turbine of claim 6, wherein an annular support of the second portion of the ring includes an upstream attachment member attaching the annular support of the first portion of the ring on a median flange of the turbine annular casing, while attaching the annular support of the second portion of the ring on said median flange.

9. The turbine of claim 8, further comprising a downstream guide vane including a radially external platform, axially engaged on a downstream flange of the turbine annular casing, wherein said external platform of the downstream guide vane attaches the annular support of the second portion of the ring to the downstream flange.

10. A method for assembling a turbine of claim 1, comprising the steps of:
   (a) mounting the first portion of the ring on a casing of the turbine, through an axial engagement in an upstream direction of said first portion relative to the casing,
   (b) mounting an impeller in the casing,
   (c) mounting the second portion of the ring on the casing of the turbine, by an axial engagement in the upstream direction of said second portion relative to the casing, wherein the at least one first wiper is introduced into at least one of the groove of the first portion and the groove of the second portion, during at least one of steps (b) and (c).

11. The turbine of claim 1, wherein the at least one first portion includes a first block of abradable material, wherein the second portion includes a second block of abradable material, and wherein the first block is separated from the second block.

* * * * *